(12) United States Patent
Nonaka et al.

(10) Patent No.: US 7,982,791 B2
(45) Date of Patent: Jul. 19, 2011

(54) CONTROLLING OPERATIONS OF A CAMERA TO IMPROVE BACKLIT SCENES

(75) Inventors: Osamu Nonaka, Sagamihara (JP); Atsushi Maruyama, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 1055 days.

(21) Appl. No.: 11/823,876

(22) Filed: Jun. 28, 2007

(65) Prior Publication Data

US 2008/0007634 A1    Jan. 10, 2008

(30) Foreign Application Priority Data

Jul. 7, 2006   (JP) ................... 2006-187289
May 11, 2007   (JP) ................... 2007-126754

(51) Int. Cl.
*H04N 5/222* (2006.01)
*H04N 5/235* (2006.01)
(52) U.S. Cl. ................. 348/333.01; 348/229.1
(58) Field of Classification Search ............. 348/229.1, 348/333.01, 333.02, 362, 364
See application file for complete search history.

(56) References Cited

U.S. PATENT DOCUMENTS

| 6,411,306 B1 * | 6/2002 | Miller et al. ............ 345/690 |
| 7,564,486 B2 * | 7/2009 | Ikeda ..................... 348/222.1 |
| 2005/0012832 A1 * | 1/2005 | Yano ..................... 348/234 |
| 2005/0122415 A1 * | 6/2005 | Hoshi ..................... 348/333.02 |
| 2005/0179639 A1 * | 8/2005 | Hsieh ..................... 345/102 |
| 2006/0245007 A1 * | 11/2006 | Izawa et al. ............ 358/448 |

FOREIGN PATENT DOCUMENTS

| JP | 07-073298 | 3/1995 |
| JP | 2004-530368 | 9/2004 |
| WO | WO 02/089060 | 11/2002 |

\* cited by examiner

*Primary Examiner* — Kelly L Jerabek
(74) *Attorney, Agent, or Firm* — John C. Pokotylo; Straub & Pokotylo (57) ABSTRACT

There is disclosed a camera in which, in a case where luminance of an acquired image signal is corrected and raised in accordance with luminance of each region, a correction amount of an image signal for use as a photographed image is smaller than a correction amount of an image signal for use as an image for monitoring.

10 Claims, 9 Drawing Sheets

Fig. 13

CONTROLLING OPERATIONS OF A CAMERA TO IMPROVE BACKLIT SCENES

CROSS-REFERENCE TO RELATED APPLICATION

This application is based upon and claims the benefit of priority from prior Japanese Patent Application Nos. 2006-187289, filed on Jul. 7, 2006; and 2007-126754, filed on May 11, 2007, the entire contents of which are incorporated herein by reference.

BACKGROUND OF THE INVENTION

1. Field of the Invention

This invention relates to a camera which can cope with photographing of a scene such as a backlight scene having a large luminance difference.

2. Description of the Related Art

A scene of backlight is difficult to shoot. An image pickup device has a small dynamic range as compared with a silver salt film. Therefore, the photographing is more difficult with a digital camera in which the image pickup device is used. Especially, in cases where a person is a main subject, failure photographs in which a face darkens owing to the backlight are taken in many cases. Therefore, in such a backlight scene in which the person is the subject, the person is usually appropriately exposed and photographed by flash photographing, or photographing using a flash light. Moreover, this flash photographing is executed through a camera user's operation of selecting a flash mode or selecting a backlight scene as a scene mode of the camera.

Heretofore, various proposals have been made concerning the photographing of this backlight scene. For example, a technology is known in which, to earn a wide dynamic range of brightness, an output from the image pickup device is controlled into an optimum contrast for each region of a screen to process and correct an image so that both of a dark portion and a bright portion can easily be seen (Japanese Patent Publication No. 2004-530368).

On the other hand, in recent years, a face detection technology has been developed (e.g., Japanese Patent Application Laid-Open No. 07-073298), so the judgment whether or not the subject is the person became possible. Therefore, the application of this face detection technology is also expected.

BRIEF SUMMARY OF THE INVENTION

In a camera of the present invention, when an acquired image signal is corrected or modified so as to raise luminance of the signal, or brightness of the image represented by the signal, in accordance with the luminance of each region, a correction amount of the image signal for use as a photographed image is smaller than that of an image signal for use as a monitor image.

One example of a constitution of the camera of the present invention can be represented as a camera comprising: a visibility improvement section which corrects an image signal of a subject acquired by an image pickup device so that luminance of the image signal is raised in accordance with luminance of each of divided regions of the subject in order to improve visibility of the subject; and a display section which displays an image based on the image signal of the subject acquired from the image pickup device, wherein the visibility improvement section sets a correction amount of the luminance of an actually photographed image to be smaller than that of an image for monitoring to be displayed in the display section.

The present invention can be understood as the invention of a method of controlling a camera and the invention of a recording medium in which a camera control program is recorded.

DETAILED DESCRIPTION OF THE PREFERRED EMBODIMENTS

First Embodiment

Figure 1:
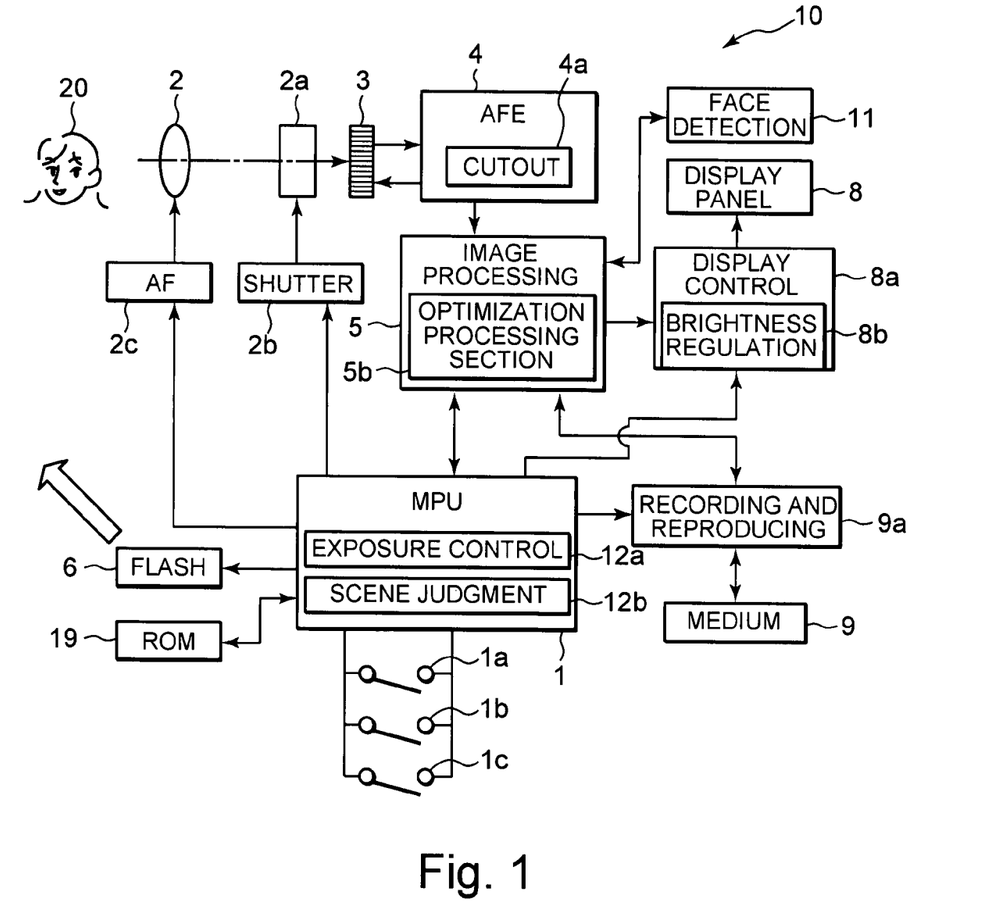
FIG. 1 is the whole block diagram of a camera 10 to which the present invention is applied in a first embodiment.

FIG. 1 is the whole block diagram of a camera 10 to which the present invention is applied. The camera 10 includes a lens section 2, a shutter 2a, an image pickup device 3, an analog front end (hereinafter abbreviated as the "AFE") section 4, an image processing section 5, a display section 8, a display control section 8a, a recording and reproducing control section 9a and a recording medium 9.

The lens section 2 forms, on the image pickup device 3, an image of a subject 20 which has entered the lens section. The shutter 2a selectively interrupts incidence of light transmitted through the lens section 2 upon the image pickup device 3 to regulate an exposure amount. The image pickup device 3 is, for example, a CMOS or a CCD which converts the subject image formed by the lens section 2 into an image signal.

The AFE section 4 converts an analog image signal output from the image pickup device 3 into digital image data to output the data. The AFE section 4 includes a cutout section 4a. In response to an instruction, the cutout section 4a sorts out the signals to be output from the image pickup device 3 to extract an only limited pixel signal from all light receiving surfaces or thin and extract pixels from the image pickup device 3.

The display section 8 can display a limited image size. Therefore, when an image for monitoring is displayed, the cutout section 4a reduces the number of the pixels, and the AFE section 4 outputs the reduced image data. In consequence, the display can be controlled at a high speed. Even if an optical finder or the like is not especially disposed, the signal which has entered the image pickup device is processed and substantially displayed in real time. In consequence, a user can shoot the image while seeing this display. During actual photographing, the AFE section 4 outputs, as a photographed image, full pixels or the image data of the pixels in accordance with a set image quality mode.

The image processing section 5 subjects the image data output from the AFE section 4 to processing of correcting gamma (gradation compensation), color, gradation, sharpness and the like. The image processing section 5 has a compression and extension section for a static image, for example, a Joint Photographic Coding Experts Group (JPEG) core section (not shown) in the image processing section. This compression and extension section compresses the image data during photographing, and extends the image data during reproducing.

The image processing section 5 includes an optimization processing section 5b. The optimization processing section 5b subjects the image signal to processing such as correction of luminance or contrast emphasis. The optimization processing section 5b divides the screen into a plurality of regions having an appropriate size to detect a bright region and a dark region from the regions in response to the image signal of the subject acquired from the image pickup device. Moreover, the regions are appropriately subjected to correction such as amplification or the contrast emphasis based on a luminance value of each region. It is to be noted that luminance amplifying correction and contrast emphasizing correction will hereinafter be referred to simply as the correction. Since the optimization processing section 5b improves visibility of the subject existing in each region, the optimization processing section will hereinafter be referred to also as the visibility improvement section.

The recording and reproducing control section 9a records the image data compressed by the image processing section 5 in the recording medium 9 during the photographing. In the recording medium 9, the image is recorded and stored. The recording and reproducing control section 9a reads the image data from the recording medium 9 during the reproducing.

The display section 8 includes a display unit, for example, a liquid crystal, an organic EL and the like, displays the image for monitoring during the photographing, and displays an extended recorded image during the reproducing. This display section 8 includes a backlight, and the display control section 8a includes a brightness regulating section 8b which changes brightness of the backlight. The brightness of the backlight can be changed automatically or by a user's operation.

During the photographing, while seeing the image displayed in the display section 8, the user determines a composition and a timing to perform a photographing operation. The image data limited to a size for display by the AFE section 4 is processed by the image processing section 5 at a high speed so that the image signal from the image pickup device 3 is substantially displayed in real time, and the data is displayed in the display section 8 via the display control section 8a.

Moreover, as described above, the optimization processing section 5b subjects the image to correction processing such as the amplification of the luminance for each region or the contrast emphasis in order to improve the visibility of the subject during the display of the image for monitoring. Furthermore, during the reproducing, the compressed data recorded in the recording medium 9 is read by the recording and reproducing control section 9a, extended by the image processing section 5 and displayed in the display section 8.

Furthermore, the camera 10 includes an MPU 1, an ROM 19 and operating sections 1a to 1c. The microprocessor (the MPU) 1 is a control section which controls the whole camera 10 during the photographing, the reproducing or the like according to a program. The ROM 19 is a nonvolatile recordable memory including, for example, a flash ROM, and a program for control is stored in the ROM 19 to perform control processing of the camera 10.

The operating sections 1a to 1c notify the MPU 1 of a camera user's instruction. As typical examples of the operating sections, the switches 1a, 1b and 1c are shown. The switch 1a is a release switch, and the switch 1b switches, for example, a photographing/reproducing mode, a photographing mode, a display mode and the like. The switch 1c is an instruction switch which is an instructing section for instructing further visibility improvement and which gives an instruction to brighten the backlight (BL) or which instructs the optimization processing section 5b to increase a luminance correction amount, so that the display section 8 can further easily be seen in a bright scene. The MPU 1 detects the user's operation of the switches 1a, 1b and 1c during the photographing, the display or the like.

Furthermore, the camera 10 includes an AF control section 2c, a shutter control section 2b, a flash section 6, an exposure control section 12a, a scene judgment section 12b and a face detecting section 11. The AF control section 2c controls a focal position of the lens section 2 based on the instruction of the MPU 1. To control the focal position, the image processing section 5 detects the contrast of the image data output from the image pickup device 3 to output the contrast to the MPU 1. In response to this output, the MPU 1 outputs a control signal to the AF control section 2c to execute the control of the focal position. The MPU 1 outputs a control signal to the AF control section 2c so as to maximize a contrast signal of the image data.

The shutter control section 2b controls opening/closing of the shutter 2a. The shutter control section 2b executes control so as to close the shutter 2a in a short time when it is bright and to close the shutter 2a in a long time when it is dark. In consequence, exposure control is performed so as to keep a quantity of light to enter the image pickup device 3 at a predetermined quantity.

The flash section (the illumination section) 6 is an auxiliary irradiating section which aids exposure. The flash section 6 can control the quantity of the light in accordance with an amount of current to be passed from a light source such as an Xe discharge emission tube. In a case where the subject is relatively or absolutely dark, the flash section 6 which projects intense light is used as auxiliary light. The auxiliary light irradiating section is not limited to flash light, and a white LED may be used as a substitute.

The exposure control section 12a embodies one of a control function executed by the MPU 1. The exposure control section 12a controls switching of a time to open the shutter 2a and reading (an electronic shutter) of data of the image pickup device 3 based on the image data output from the AFE section 4. The exposure control section 12a controls an ND filter (not shown), an aperture stop (not shown) and the flash section 6, and controls brightness of the image to be adequate in cooperation with a gamma correcting function of the image processing section 5.

Furthermore, the exposure control section 12a controls the brightness of the image alone or in cooperation with the optimization processing section 5b. Moreover, to execute the exposure control for improving the visibility in cooperation with the optimization processing section 5b, the exposure control section 12a changes conditions of the exposure control so as to optimize the control during the photographing and the display of the image for monitoring. Unlike conventional photograph film and print, since it is difficult to finely record and display brightness and darkness owing to a small dynamic range, the exposure control section 12a and the optimization processing section 5b controls the image pickup device 3 including the CCD and the display section 8 further by use of backlight (BL) control of the display section 8 so that the subject can visually be recognized and identified in various scenes.

The scene judgment section 12b embodies one of processing functions to be executed by the MPU 1. The scene judgment section 12b analyzes the image data (the image for monitoring) to be output from the AFE section 4 to judge the brightness of the whole screen, and also judges whether the scene is a dark scene or a backlight scene. The scene judgment section 12b uses the image data in a broad range of the screen during the judgment. To judge the scene, the scene judgment section 12b also uses results of the face detection performed by the face detecting section 11. Moreover, the exposure control section 12a controls the shutter control section 2b and the aperture stop (not shown) according to the results of the scene judgment to switch the quantity of the light to enter the image pickup device 3.

The face detecting section 11 detects, by use of the image data, whether or not a human face exists in the subject. The face detecting section 11 extracts a characteristic point from information during focusing and the image for monitoring described above based on the image data (the image for monitoring) output from the image processing section 5 to detect the face. Moreover, when the face is detected, the face detecting section 11 outputs a size and a position of the face in the screen to the MPU 1. In addition, in a case where the main subject is positioned at a dark part of the screen of the backlight scene or the like, the image is blackened, and a fine difference between the brightness and the darkness cannot be seen. In this state, the face detecting section 11 cannot detect the face. In such a backlight scene, to detect the face, the optimization processing section 5b and the exposure control section 12a perform processing and control so as to brighten the dark part as described later in detail.

Figure 2A:
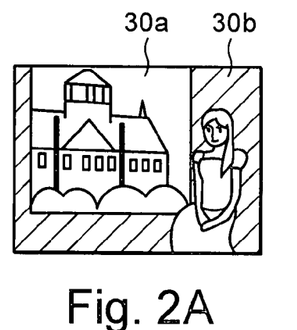
FIGS. 2A to 2C are diagrams showing a general example of a backlight photographing scene in the first embodiment.
Figure 2B:
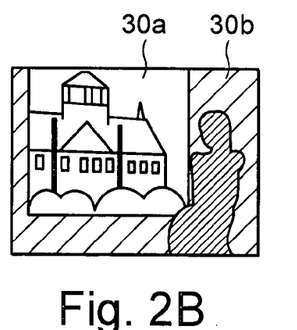
Figure 2C:
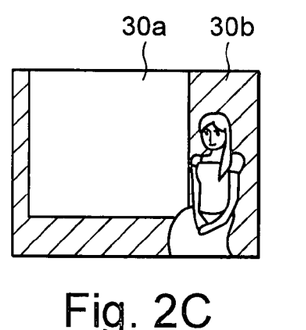

FIGS. 2A to 2C are explanatory views of a problem of the first embodiment. FIGS. 2A to 2C show examples of general screens of the backlight scene to be photographed. In the screen, both of a bright outdoor landscape 30a and a person 30b in a dark room exist. FIG. 2A is a diagram showing a desirable scene to be photographed in this screen. That is, to beautifully depict the bright outdoor landscape 30a and the person 30b in the dark room is the desirable photographing. However, heretofore, since the dynamic range of the image pickup device 3 is limited, either an image (see FIG. 2B) in which a bright part (the landscape 30a) is regarded as important or an image (see FIG. 2C) in which a dark part (the person 30b) is regarded as important can only be obtained as the image to be taken.

Similarly, as to the image for monitoring to be displayed in the display section 8 during the photographing, heretofore, since the dynamic ranges of the image pickup device 3 and the display section 8 are limited, either the image (see FIG. 2B) in which the bright part (the landscape 30a) is regarded as important or the image (see FIG. 2C) in which the dark part (the person 30b) is regarded as important can only be displayed. That is, the person 30b is blackened in the image of FIG. 2B, and the landscape 30a whitens and disappears in the image of FIG. 2C. The camera 10 of the present embodiment has been developed to solve this problem, and beautifully depicts both of the bright outdoor landscape 30a and the person 30b in the dark room.

Figure 3:
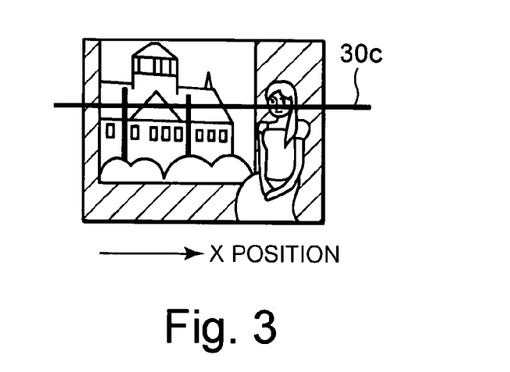
FIG. 3 is a diagram showing positions of a luminance distribution in the same scene as that of FIG. 2 in the first embodiment.
Figure 4A:
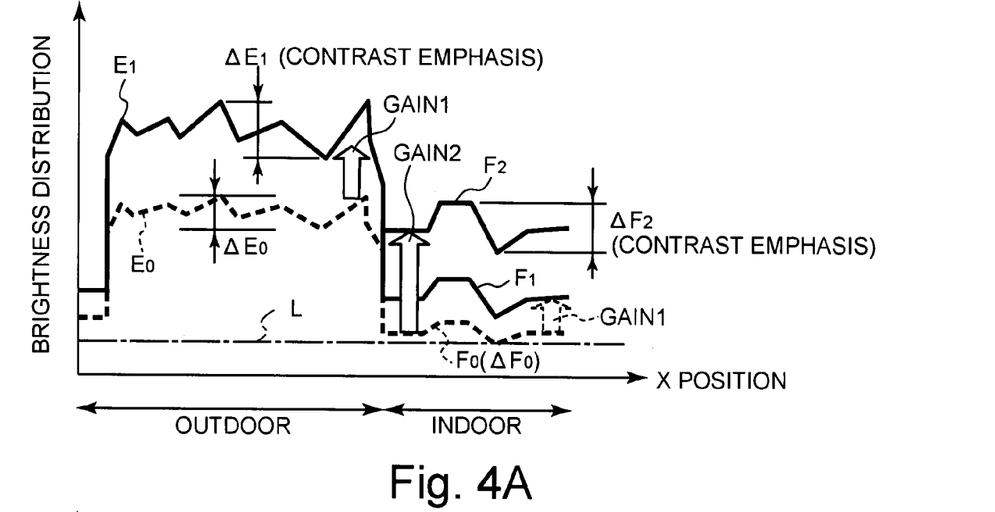
FIGS. 4A, 4B are graphs showing outdoor and indoor brightness and contrast corrected by an optimization processing section in the first embodiment.
Figure 4B:
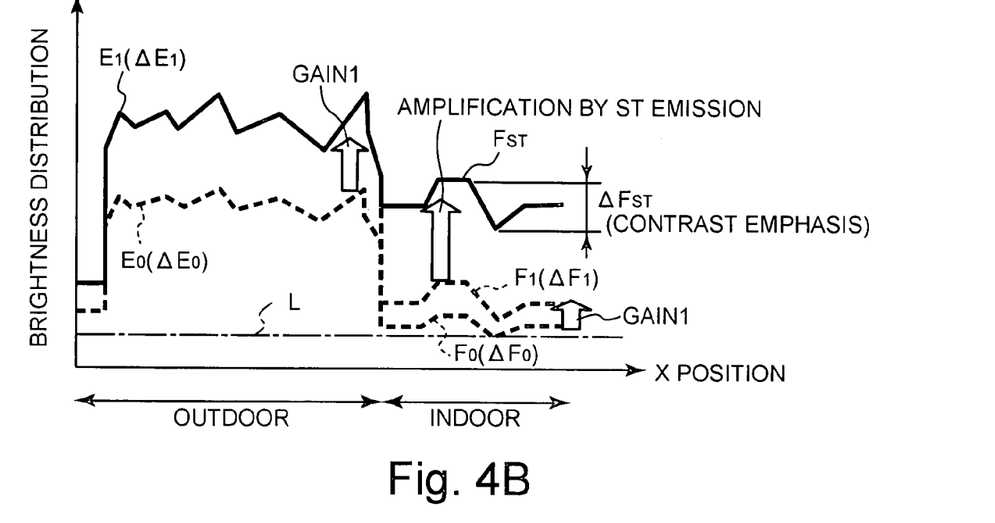

FIG. 3 shows the same scene as that of FIG. 2, and shows, in a line 30c, a position where a luminance distribution of the screen shown in FIGS. 4A, 4B is extracted. FIGS. 4A, 4B are graphs of the luminance distribution of the screen along this line 30c.

FIGS. 4A, 4B are graphs showing control processing to be performed by the optimization processing section 5b as the visibility improvement section during the photographing. The optimization processing section 5b performs the processing for improving the visibility of the image during both of the display of the image for monitoring and the actual photographing. FIGS. 4A, 4B both show the graphs of the luminance distribution along the line 30c of FIG. 3, the abscissa indicates a position of the screen in a horizontal direction, and the ordinate shows the brightness (a luminance value). The brightness in an upward direction indicates increasing a brightness. Moreover, L (a fine one-dot chain line) indicates a noise level of the image pickup device 3. That is, the level L or less is a noise region where it is difficult to identify the image.

FIG. 4A is an explanatory view of first processing to be performed by the optimization processing section 5b. Broken lines (E0, F0) are luminance curves before the processing, E0 is a luminance curve of the landscape 30a, and F0 is a luminance curve of the person 30b. Furthermore, ΔE0, ΔF0 are luminance differences (contrasts) between the landscape and the person, respectively. The brightness curve before the processing is a curve of an image of the landscape 30a obtained by the exposure control performed so as to obtain an adequate luminance level. Moreover, in this scene, it is assumed that, along the curve F0 of the person 30b, only brightness equal to the noise level L is obtained and the part of the person is blackened (see FIG. 2B).

To solve the problem, the optimization processing section 5b first performs amplifying correction of the part of the landscape 30a with a gain 1 which is a predetermined correction amount, and raises the luminance of the landscape 30a from E0 to E1. Furthermore, the optimization processing section 5b performs contrast emphasis processing of the landscape 30a, and raises the contrast from ΔE0 to ΔE1.

On the other hand, even if F0 of the person 30b is raised to F1 with the gain 1, there is little possibility that F1 becomes sufficiently higher than the noise level. That is, there is high possibility that the visibility cannot sufficiently be secured at this level. This is because the amount of the gain 1 is a correction amount for the landscape 30a, and the gain 1 cannot be set to a sufficiently large value. Since a certain degree of brightness is secured in the landscape 30a, a comparatively small gain to such an extent that the landscape 30a is not saturated is only obtained as the gain 1.

To solve the problem, the optimization processing section 5b performs the correction processing of the person 30b with a gain 2 as a correction value larger than that of the gain 1 to raise the luminance curve from F0 to F2. Moreover, the optimization processing section 5b performs large contrast emphasis processing as compared with the landscape 30a to raise the contrast from ΔF0 to ΔF2. In consequence, the visibility in the room sufficiently improves. Therefore, an image (FIG. 2A) providing the visibility close to that obtained by human eyes can finally be achieved.

Moreover, in the first processing, the optimization processing section 5b (the visibility improvement section) varies the luminance correction amount and the correction amount of the contrast emphasis with the bright part and the dark part, when performing the processing. In consequence, the visibility improves in not only a part of the screen but also the whole screen. This processing is especially effective for the screen having a large luminance difference. It is to be noted that this processing may be applied to both of the image for monitoring and the image during the photographing, or may be applied to the only image for monitoring. It is to be noted that, in a case where the processing is applied to both of the image for monitoring and the image during the photographing as described later, the correction amount for the image for monitoring is set to be larger than that for the image during the photographing. This also applies to a contrast emphasis amount.

Next, second processing will be described in which the optimization processing section 5b is also used during flash photography. The second processing is processing mainly for the image data during the photographing. FIG. 4B is an explanatory view of the processing to be performed by the optimization processing section 5b during the flash photographing. In the above-mentioned example of the first processing shown in FIG. 4A, the luminance is raised by the only image processing performed by the optimization processing section 5b. Therefore, if the correction amount is large, the processed image might be unnatural. In a case where the luminance of the dark part (the indoor part) is equal to or less than the noise level, since noises are also amplified, a noisy image might conspicuously be obtained owing to noise increase due to the amplification (the correction). This raises a large problem during the actual photographing. To solve the problem, in the second processing, flash illumination is combined with the optimization processing to solve this problem.

In the same manner as in FIG. 4A, one-dot chain line (E0, F0) curves of FIG. 4B are luminance curves before the processing. First, the optimization processing section 5b performs luminance correction of landscape and person parts with a gain 1 similar to that of the first processing. In consequence, the luminance of an outdoor part (the landscape) rises from E0 to E1, and the luminance of an indoor part (the person) rises from F0 to F1. The optimization processing section 5b also performs contrast emphasis correction processing of the outdoor and indoor parts. In consequence, the contrast of the outdoor part increases from ΔE0 to ΔE1, and the contrast of the indoor part increases from ΔF0 to ΔF1.

Moreover, as described above, in this case, since there is high possibility that the visibility of the indoor part is insufficient, flash emission is added in the present example. The flash emission raises the luminance of the person part from F1 to Fst. The contrast also increases from ΔF1 to ΔFst. On the other hand, since flash light does not reach the outdoor part owing to a distance, the luminance does not change from E1, and the contrast does not change from ΔE1. It is to be noted that it has been described above that the flash emission processing is performed after the luminance correction and the contrast emphasis correction, but this is only for the convenience of the description, and an actual photographing procedure is reversed.

That is, the correction amount for the subject (in a range reached by the flash light) having a low luminance in the second processing is smaller than that in the first processing. Moreover, this difference between the correction amounts is compensated by irradiation with the flash light.

As described above, in the second processing, the visibilities of both of the outdoor landscape and the person in the room improve. Since the low-luminance part is compensated with the flash light to increase the luminance, it is prevented that the actually photographed image becomes noisy owing to the only electric correction. That is, a very natural image is obtained as shown in FIG. 2A. It is to be noted that this processing may be applied to not only the photographing but also the display of the image for monitoring. However, when the flash emission is used, the image for monitoring becomes intermittent images. Therefore, continuously emittable illumination means such as LED illumination is more preferable.

Figure 5:
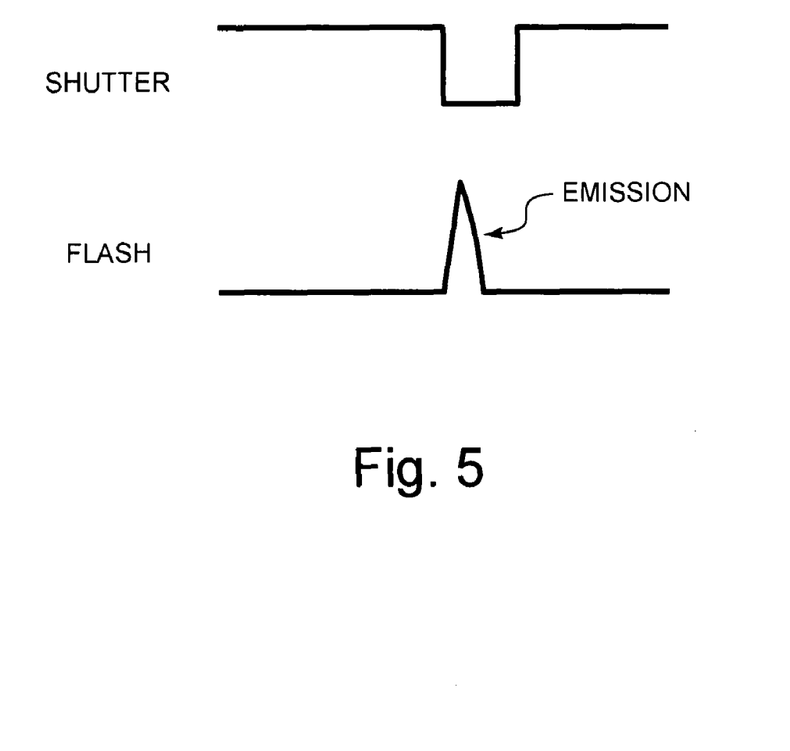
FIG. 5 is a timing chart showing timings of a shutter and flash emission during photographing in the first embodiment.

FIG. 5 is a timing chart showing timings of the shutter and the flash emission during the photographing described with reference to FIG. 4B. In the timing chart of the shutter, a low level is an open level. Since the flash light is emitted for a short time, the shutter time is reduced in accordance with the flash emission. That is, in the above-mentioned photographing, it is preferable to control the shutter at a high speed. When a shutter open time (LOW) is reduced, a contribution ratio of the flash light to the exposure can be set to be relatively large.

Figure 6:
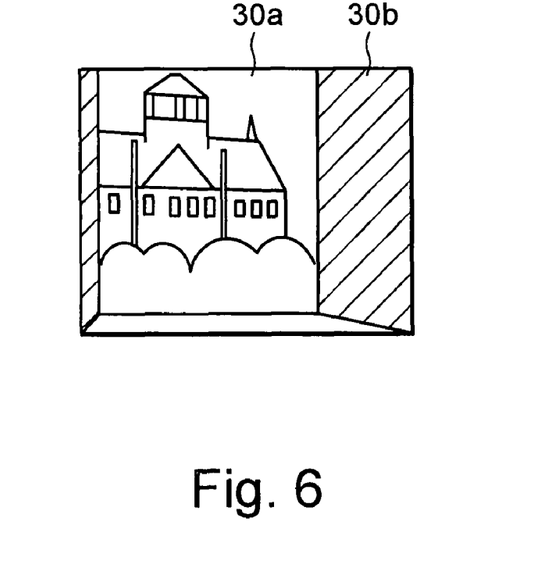
FIG. 6 is a diagram showing landscape without any person in the first embodiment.

FIG. 6 is a diagram showing a scene of only backlight landscape without any person. In such a scene, the optimization processing section 5b does not perform the optimization processing. The optimization processing section 5b performs the optimization processing of the scene in which the person is detected at the backlight part as shown in FIG. 3, and performs the exposure control. In the scene of the only landscape in which any person does not exist under the backlight, that is, in a photograph in which the landscape stands out, the exposure control does not have to be performed usually. In such a scene, when the photographing is not aided with extra light, an effect is produced that the dark part is emphasized. Furthermore, when the flash light is not emitted, energy consumption can be reduced.

Figure 7A:
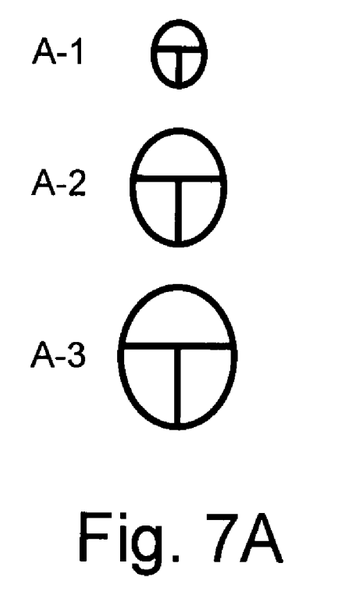
FIGS. 7A, 7B are diagrams showing an example in which it is judged by face detection whether or not there is a person in a screen according to the first embodiment.
Figure 7B:
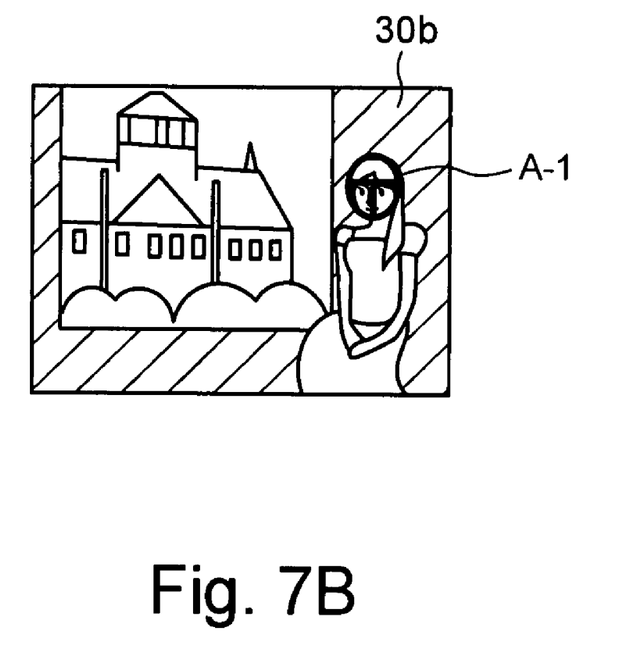

FIGS. 7A, 7B are explanatory views briefly showing an example in which the face detecting section 11 detects the face. It is judged by this face detection whether or not the person exists in the screen. Various means for judging the existence of the person are used, but here a method of detecting whether or not there is a facial pattern in the screen to judge the presence of the person will be described. FIG. 7A shows one example of a face similarity pattern as a reference. In the drawing, (A-1), (A-2) and (A-3) are face similarity patterns having different face sizes, and such face similarity patterns (A-1), (A-2) and (A-3) are stored beforehand in the ROM 19.

The scene of FIG. 7B is the same as that of FIG. 2. In the scene of FIG. 7B, the face detecting section 11 scans the face similarity patterns (A-1), (A-2) and (A-3) as the references in the screen. If a part matching the reference is detected, it is judged that the person exists in the photographed screen. Here, a case where the face similarity pattern A-1 is matched is shown.

Figure 8:
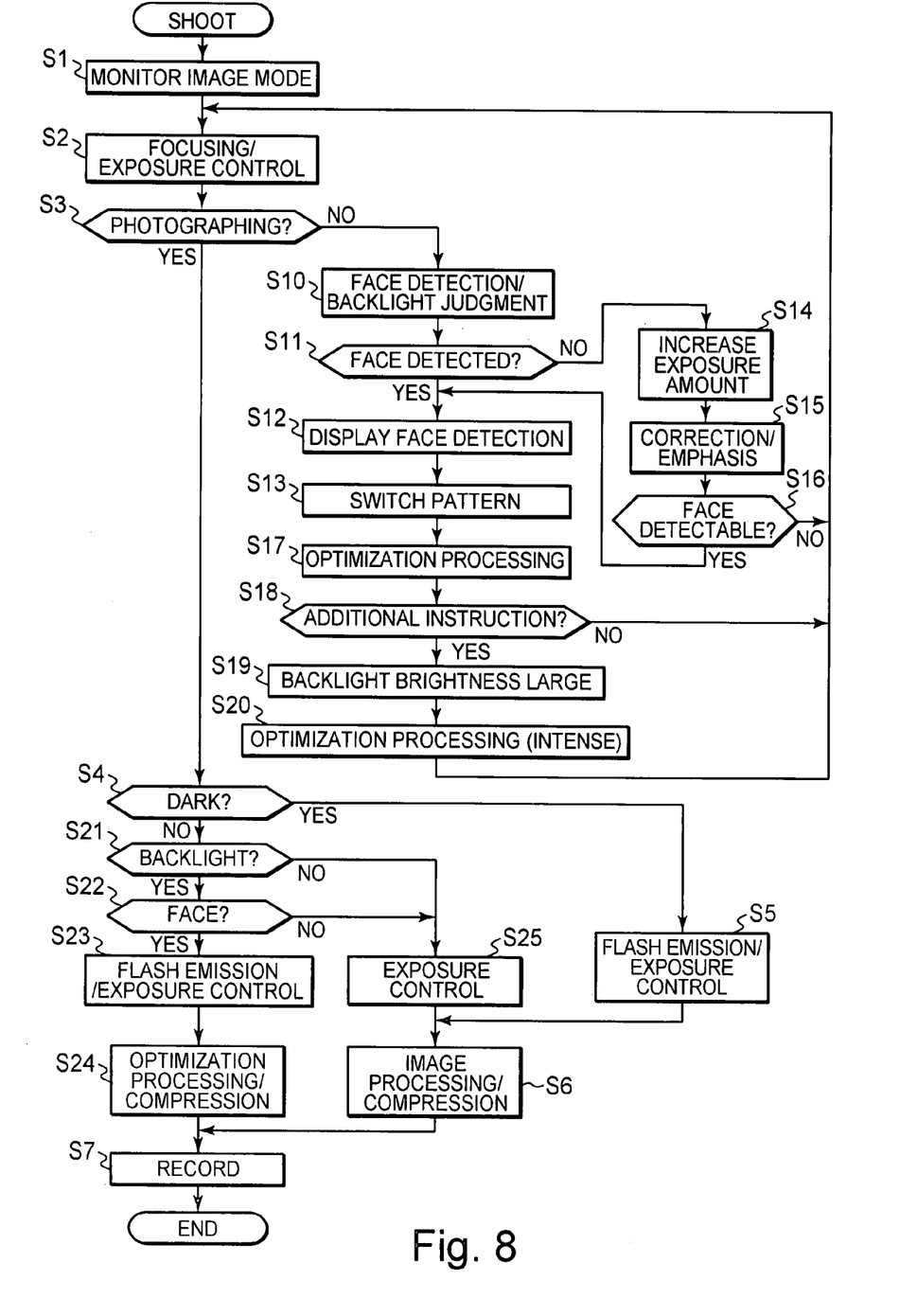
FIG. 8 is a flow chart showing a procedure of control processing of FIG. 4 in the first embodiment.

FIG. 8 is a flow chart showing a procedure of control processing during the photographing when the optimization processing is mainly performed. This control processing is performed mainly by the MPU 1, the image processing section 5, the optimization processing section 5b, the exposure control section 12a, the scene judgment section 12b, the face detecting section 11 and the like in accordance with a program.

First, a mode of the camera 10 is set to a monitor image mode (step S1). The monitor image mode is a mode in which an output of the image pickup device is displayed as the image for monitoring in the display section 8 during the photographing. In this mode, the image pickup device 3 and another system are driven and controlled so that delay is not generated in the image display. Based on the image data obtained here, focal control of the lens section 2 and control of exposure by the exposure control section 12a are also performed (step S2).

Subsequently, a release operation is waited (step S3), but prior to the photographing (step S3 NO), the face detection and backlight judgment are performed (step S10). The face detection is performed by the face detecting section 11, and the backlight judgment is performed by the scene judgment section 12b, respectively. Moreover, the face detecting section 11 can judge whether or not the face detection can be performed (step S11). When the face detection can be performed, this effect is displayed in the display section 8 (step S12). Furthermore, the similarity pattern for face detection is switched from the face similarity pattern of default shown in FIG. 7A to the presently detected face similarity pattern (a pattern close to a feature of the presently detected face) (step S13). In consequence, a detection speed of second or subsequent detection can be increased. That is, since the pattern stored as the reference (the reference face similarity pattern) is switched to a new, face similarity pattern to detect the face, the face can quickly be judged in the scene where the face does not move. Even when a position and an angle of the face change, the vicinity of the previously detected position of the screen is mainly detected. In consequence, an effect that the face part is tracked can be obtained.

Moreover, when the face is detected (step S11 YES), as shown in FIG. 4A, the optimization processing section 5b subjects the face part and the person to the optimization processing of correcting the brightness of the part and emphasizing the contrast (step S17). The image subjected to the optimization processing including the correction of the brightness of the face part and the emphasizing of the brightness is displayed in the display section 8. During the monitor display prior to this release, the image is constantly switched. Therefore, any disturbance due to any degree of noises is not noticed. It is important whether or not facial expression can be seen. To solve the problem, the optimization processing is performed so as to improve the visibility, so that the person of the subject can well be seen in the display section 8. During outdoor photographing, since sunlight is reflected by a surface panel of the display section 8, a fine noise level is not noticed in many cases.

During the monitor display, the optimization processing is to be further intensified in some case. This situation is automatically judged with a sensor (not shown), or by operating an operation button (the switch 1c) for the user to further check the screen (step S18). This operation is detected (step S18 YES), and the brightness regulating section 8b of the display control section 8a controls the backlight (BL) of the display section 8 to be brighter (step S19). Moreover, the optimization processing section 5b performs processing to further increase the correction amount of the dark part or further emphasize the contrast value (step S20). This is also referred to as the intense optimization processing.

When the face is detected in this manner, the display section displays the face visibly as much as possible, and the processing returns to the step S2. In the step S2, the focal control and the exposure control in which the face part is regarded as important may be performed by use of detected facial information. Moreover, while circulating this loop, a release operation is waited (step S3).

On the other hand, when the face cannot be detected in the step S11 (step S11 NO), the processing is performed so as to realize the face detection. For example, in the image in which the face is too dark to be detected as shown in FIG. 2B, the exposure and the processing of the image are switched to obtain the image in which background is whitened to disappear, the dark part is regarded as important and the face can be detected as shown in FIG. 2C.

First, the exposure control section 12a lengthens an exposure time for the face detection to increase the exposure amount (step S14). Furthermore, the optimization processing section 5b performs emphasizing correction processing (amplifying correction, contrast emphasis or the like) for the face detection (step S15). Specifically, as described with reference to FIG. 4A, the optimization processing section 5b subjects an image signal of the dark part to the amplifying correction and the emphasizing correction. As the case may be, as described with reference to FIG. 4B, when the flash irradiation and the LED light source are disposed, the image is continuously irradiated, and the exposure is compensated. The control may be performed so as to easily detect the face. It is to be noted that combination and sorting of the above-mentioned long-time exposure, the amplifying correction/contrast emphasis correction and each processing of the illumination are matters of selection in accordance with situations.

As described above, the image in which the background is whitened to disappear and the dark part is regarded as important as shown in FIG. 2C, or an image close to the image is obtained. In consequence, even if the dark part includes the face, a clear image of a face part, which has not been obtained from the image shown in FIG. 2B, can be obtained, and the face detection is facilitated. It is to be noted that this image is the image for monitoring. Therefore, even if a background part is saturated, the photographing is not directly influenced. When the face can be detected, step S16 is branched to YES, and the processing advances to the step S12 and subsequent steps. On the other hand, when the face cannot be detected (step S16 NO), the processing returns to the step S2.

Figure 9:
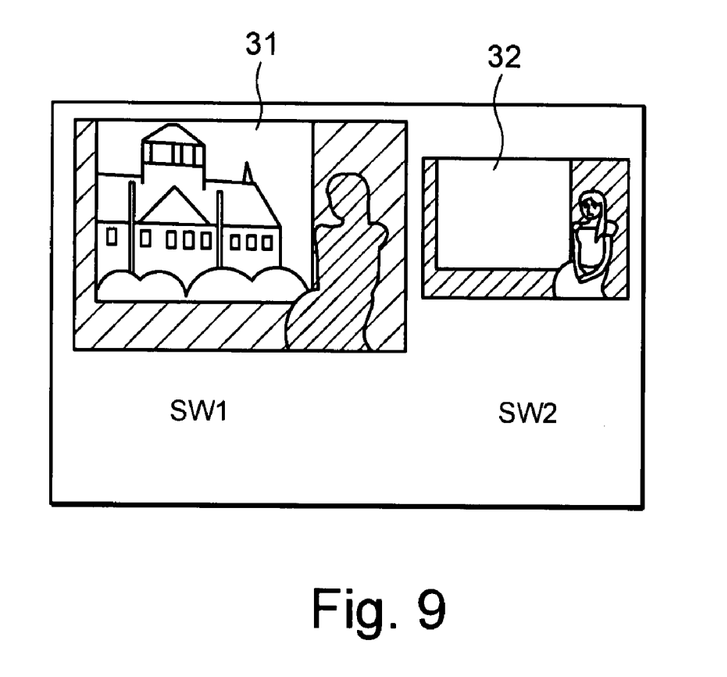
FIG. 9 is a diagram showing a screen in which a main image 31 and an auxiliary image 32 are simultaneously displayed in the first embodiment.

It is to be noted that when the face can be detected in this manner, the image subjected to the emphasizing correction processing for the face detection may be displayed as an auxiliary image 32 in the display section 8. FIG. 9 is a diagram showing a screen in which a main image 31 as a usually displayed image and the auxiliary image 32 are simultaneously displayed. Here, the auxiliary image is one of three types of images which are an image subjected to the optimization processing for the face display in the step S17, an image subjected to the intense optimization processing in the step S20 and an image subjected to the emphasis processing for the face detection in the step S15. In a case where the image subjected to the optimization processing for the face display in the step S17 or the image subjected to the intense optimization processing in the step S20 is displayed as the auxiliary image, an image obtained by subjecting the image obtained from the image pickup device 3 to the optimization processing and an image which is not subjected to the processing may simultaneously be displayed.

On the other hand, when the image subjected to the emphasis processing for the face detection in the step S15 is displayed as the auxiliary image, the two images have different shutter speeds, and the later image processing cannot cope with the display. Therefore, the images are alternately obtained from the image pickup device at two shutter speeds for the main image 31 and the auxiliary image 32. Moreover, the corresponding processing is performed to display two processed images. In addition, a ratio of the reading counts for each of the two images is not necessarily have to be set to 1:1. It is to be noted that the switching of the shutter speed in accordance with the image to be read is controlled by the exposure control section 12a. Owing to such a devise, the user can shoot the image while simultaneously confirming the background and the person's facial expression.

On the other hand, in a case where the mode in which the auxiliary image is not simultaneously displayed as in FIG. 9 is selected, when the image subjected to the emphasis processing for the face detection in the step S15 is required, the exposure control section 12a controls and switches the shutter speed so that the image mainly including the face as in FIG. 2C is not obtained in each image read from the image pickup device 3, and is obtained as one image of several images from the image pickup device (e.g., once per ten times). When the image is frequently sorted in accordance with the shutter speed for the face detection, movement of the subject becomes unnatural, and the displayed image is influenced.

The description returns to the flow chart of FIG. 8. When a photographing instruction is given by the user (step S3 YES), the photographing is performed. Here, the exposure control is changed in accordance with conditions "dark", "backlight condition" and "face existence" (steps S4, S21 and S22). It is to be noted that "backlight" or "face existence" is judged by use of results of face detection backlight judgment in the steps S10, S11.

First, the scene judgment section 12b judges whether or not the whole subject is dark (step S4). When the scene judgment section 12b judges that the whole subject is dark (step S4 YES), the photographing is performed by the exposure control involving flash emission (step S5). At this time, an ND filter and aperture stop control may be used for a very close subject. On the other hand, when the subject is not dark and the backlight is not found (step S4 NO, step S21 NO), the photographing is performed by the usual exposure control without using any flash light (step S25). Even when the subject is not dark and includes the backlight but does not include any face (step S4 NO, step S21 YES and step S22 NO), the photographing is performed by the usual exposure control (step S25). This is because the landscape may clearly be photographed in the scene shown in FIG. 6.

Moreover, when the whole subject is not dark and includes the backlight and the face as in the scenes of FIGS. 2A to 2C (step S4 NO, step S21 YES and step S22 YES), influences of the ND filter and the aperture stop are excluded as much as possible, and the photographing is performed by the flash emission by the flash section 6 described with reference to FIG. 4B and the exposure control (step S23). During the actual photographing, the AFE section 4 outputs the image data including full pixels or the designated number of the pixels. Moreover, the image processing section 5 performs image processing including the optimization processing to compress the image (step S24). As the optimization processing, as shown in FIG. 4B, the optimization processing section 5b performs such processing as to widen the contrast in the whole screen and processing of amplifying the luminance of the dark part.

In the step S24, the optimization processing section 5b sets a value of luminance/contrast emphasis (the correction amount) to be smaller than that in the monitor display (steps S17, S20). That is, instead of securing the luminance by the only image processing, the light is compensated by use of the flash emission of the step S23, an amount of image emphasis is not set to be excessive, and an image without any collapse is obtained as described with reference to FIG. 4B. Moreover, the image is recorded in the recording medium 9 (step S7).

After the photographing (the exposure control) of the steps S5 and S25, all pixel data is read from the image pickup device, the image processing section 5 processes and compresses the resultant image (step S6), and the image is recorded in the recording medium 9 (step S7).

Figure 10A:
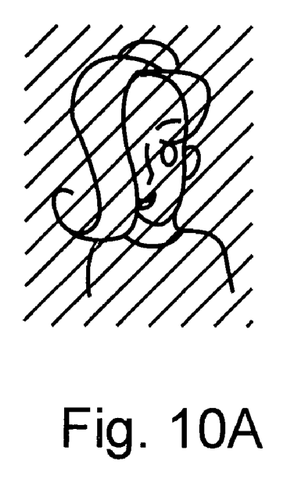
FIGS. 10A to 10C are diagrams showing examples of images due to a difference of a correction amount of the optimization processing section during display of an image for monitoring and during actual photographing in the first embodiment.
Figure 10B:
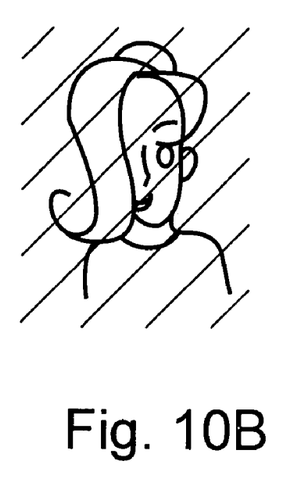
Figure 10C:
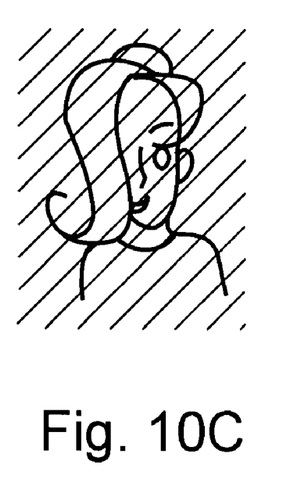

FIGS. 10A to 10C are explanatory views showing magnitude of correction to be performed by the optimization processing section 5b during the monitor display and the photographing. FIG. 10A shows a person image before the correction, FIG. 10B shows a corrected person image during the monitor display and FIG. 10C shows a corrected person image during the photographing. That is, in a remarkably dark scene shown in FIG. 10A, the optimization processing section 5b increases the correction amount of the luminance/contrast or the like so that the face of the subject can clearly be recognized in the monitor display. On the other hand, during the photographing, the optimization processing section 5b sets the correction amount to be smaller than that during the monitor display. Moreover, if necessary, shortage of the luminance is supplemented with the flash illumination during the photographing.

A reason why the conditions of the image emphasis processing are changed during the photographing and the monitor display is that a characteristic of the actually photographed image is largely different from the image for monitoring in which the contrast of the only face part is mainly emphasized or the face part is brightened to simply improve the visibility of the face. That is, during the monitor display, the sunlight may be reflected depending on a direction in which the camera is held, and the visibility thus deteriorates. To improve this visibility, intense correction is necessary. However, during the photographing, such improvement is not necessary. The background needs to be rather balanced, and natural gradation of shading of the face needs to be represented. In a backlight scene in which the face is shaded, if the visibility is tried to be improved by only emphasizing the image during the photographing, an unnatural image is obtained. However, if the image is irradiated with the flash light, a naturally depicted image can be obtained.

As described above, according to the first embodiment, even in a scene having a rapid change of the luminance, for example, in the photographing under intense sunlight, the image processing and the flash emission are selectively used. In consequence, even the person's countenance and face complexion can appropriately be confirmed, and the image can clearly be taken. That is, even in the scene having a large luminance difference, the visibility of the image for monitoring is secured, and the image can be taken with high power of expression.

Moreover, even under the backlight under which it is difficult to identify the person, the exposure is finely controlled and the switching of the amount of the image emphasizing correction is devised to detect the subject's face during the display of the image for monitoring. In consequence, the situation of the subject can appropriately be judged. Furthermore, when the person is judged to be the main subject, the person's countenance and complexion can correctly be reproduced. Moreover, the photograph can be taken in an enhanced atmosphere without ignoring even the depiction of the background.

Second Embodiment

A second embodiment will be described with reference to FIG. 11. In the second embodiment, an amount of flash emission for the subsequent photographing is controlled in accordance with an amplification amount (a luminance correction amount) during optimization processing and/or a correction amount of contrast emphasis. Briefly, in a framing state (a monitor image display state) prior to the photographing, display of a dark place including a face with corrected brightness and display at emphasized contrast are performed in accordance with scene judgment which is one characteristic of the present invention. Moreover, in the subsequent photographing, the flash emission amount is controlled in accordance with the amplification and the emphasis amount during the display, so that the image can be taken more naturally.

Figure 11:
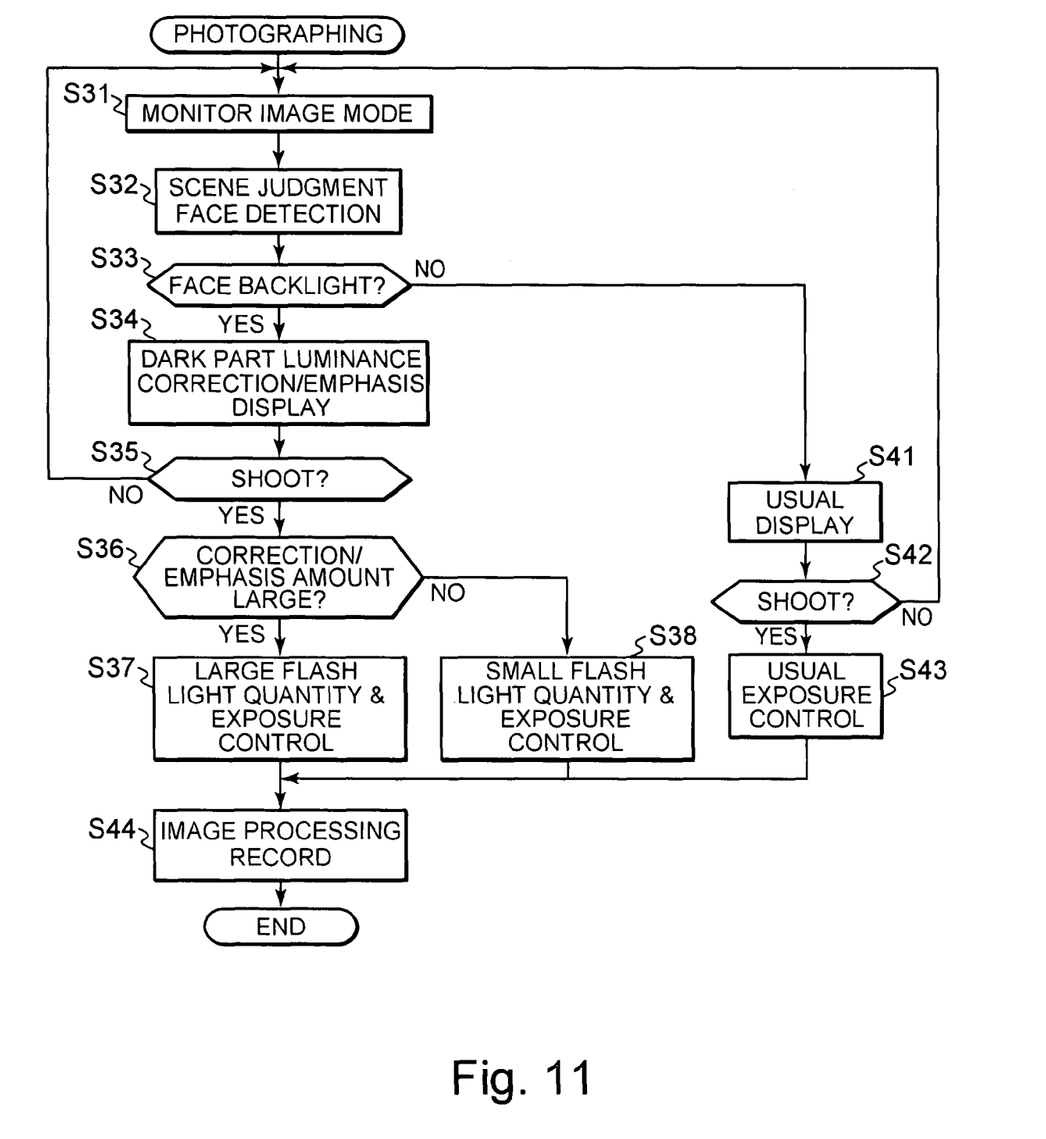
FIG. 11 is a flow chart showing a procedure of control processing in a second embodiment.

FIG. 11 is a flow chart showing a procedure of photographing control processing in the second embodiment. This photographing control processing is mainly performed by an MPU 1, an image processing section 5, an optimization processing section 5b, an exposure control section 12a, a scene judgment section 12b and a face detecting section 11 in accordance with a program. It is to be noted that a block diagram of a camera to which the present embodiment is applied is similar to FIG. 1, so the explanation thereof is omitted here.

A camera 10 is set to a monitor image mode, and an image for monitoring output from an image pickup device is displayed in a display section 8 (step S31). A user determines photographing timing and composition while seeing the display. At this time, the scene judgment section 12b judges a scene, and the face detecting section 11 detects whether or not a face is present (step S32). Moreover, it is judged whether or not a face part is under backlight (step S33). When the face part of a subject is under backlight (step S33 YES), the optimization processing section 5b subjects an image for display to optimization processing (a dark part is subjected to image processing such as luminance correction and contrast emphasis correction) so that countenance of the face is seen well. The image subjected to the optimization processing is displayed in the display section 8 (step S34). Moreover, a photographing instruction is waited (step S35).

On the other hand, when the face part is not under the backlight (step S33 NO), the optimization processing section 5b does not perform the luminance correction or the contrast emphasis correction, and the image is usually displayed (step S41). Moreover, the photographing instruction is waited (step S42). When the photographing instruction is detected (step S42 YES), the photographing is performed by usual exposure control (step S43).

When the photographing instruction is detected in the step S35 (step S35 YES), the processing advances to step S36. Subsequently, a quantity of flash light to be emitted during photographing is switched in accordance with the amount obtained by the luminance correction or the emphasis correction in the step S34. During the photographing, all or a part of the luminance correction/contrast emphasis correction performed by the image processing section 5 in the step S34 is compensated by illumination with the flash light.

A magnitude of the luminance correction amount/contrast emphasis correction amount obtained in the step S34 is judged (step S36). When the luminance correction amount/contrast emphasis correction amount of the image for monitoring is large (step S36 YES), the photographing is performed with a large quantity of the flash light under the exposure control during the photographing (step S37). In this case, since the face part has a largely insufficient luminance, all or most of the luminance is compensated with flash emission. Conversely, when the luminance correction amount/contrast emphasis correction amount of the image for monitoring is small (step S36 NO), the photographing is performed with a small quantity of the flash light under the exposure control (step S38). In this case, since the face part has little luminance shortage, the luminance is compensated with the emission of a small quantity of the flash light and the luminance correction/contrast emphasis correction performed by the optimization processing section 5b. Since the face part has little shortage of light, the flash emission may be stopped, and the shortage may be compensated with the only luminance correction/contrast emphasis correction performed by the optimization processing section 5b. Moreover, after the steps S37, S38 and S43, the image is subjected to predetermined image processing and recorded (step S44).

As described above, when the quantity of the flash light is increased or decreased in accordance with the luminance correction amount/contrast emphasis correction amount of the image for monitoring obtained by the optimization processing section 5b, an energy saving effect is pursued. Moreover, the flash emission prevents the image from being unnatural. For example, even under the backlight, in a case where a luminance difference between the face and background is as small as 3 EV or less, even if the quantity of the flash light is small, regulation can be performed so as to balance visibilities of both of the face and the background by the image processing. If an emphasized amount is small, the quantity of the flash light is reduced to prevent the image from being unnatural. Moreover, the energy saving effect can be produced.

On the other hand, the image for monitoring having large luminance correction amount and contrast emphasis correction amount does not have a large problem of noise or the like as long as the image is the image for monitoring. However, the image having the large luminance correction amount and contrast emphasis correction amount is not suitable as a photographed image, because wrong color and rough screen due to the noise are obtained. To solve the problem, when the image for monitoring is the image having a large correction amount, the quantity of the flash light to be emitted during the photographing is increased, and a signal of a part tend to be easily buried in the noise is intensified. In consequence, the photographed image obtained by the image emphasis can be prevented from being unnatural.

Third Embodiment

A third embodiment will be described with reference to FIGS. 12A, 12B and 13. The third embodiment relates to control processing of improving visibility of a displayed image for monitoring by a new combination of optimization processing and exposure control. It is to be noted that a block diagram of a camera to which the present embodiment is applied is similar to FIG. 1, and the explanation thereof is therefore omitted here.

Figure 12A:
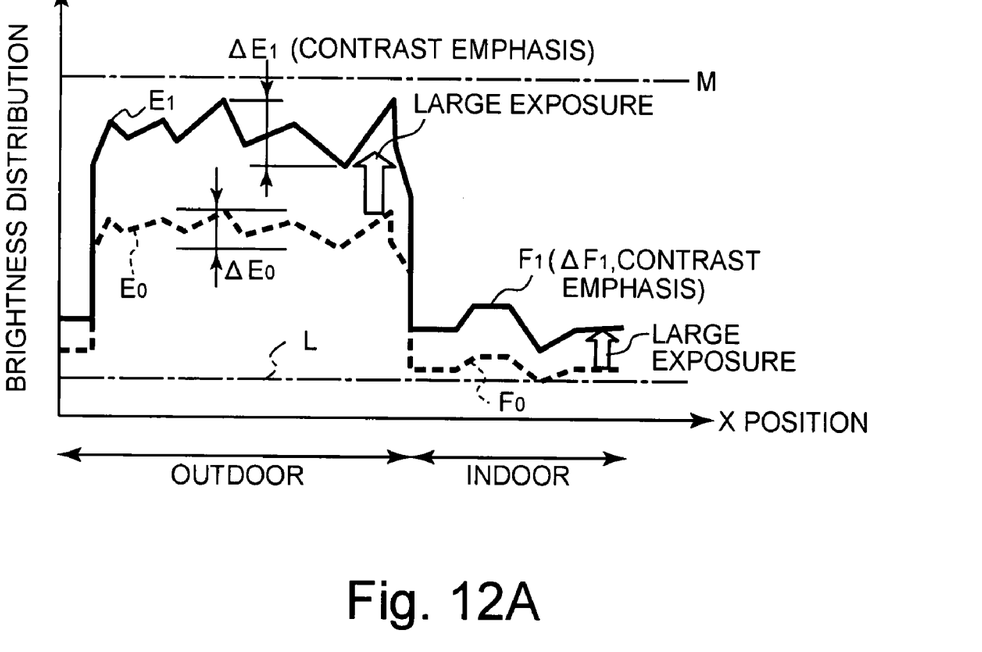
FIGS. 12A, 12B are graphs showing outdoor and indoor brightness and contrast corrected by an optimization processing section in a third embodiment.
Figure 12B:
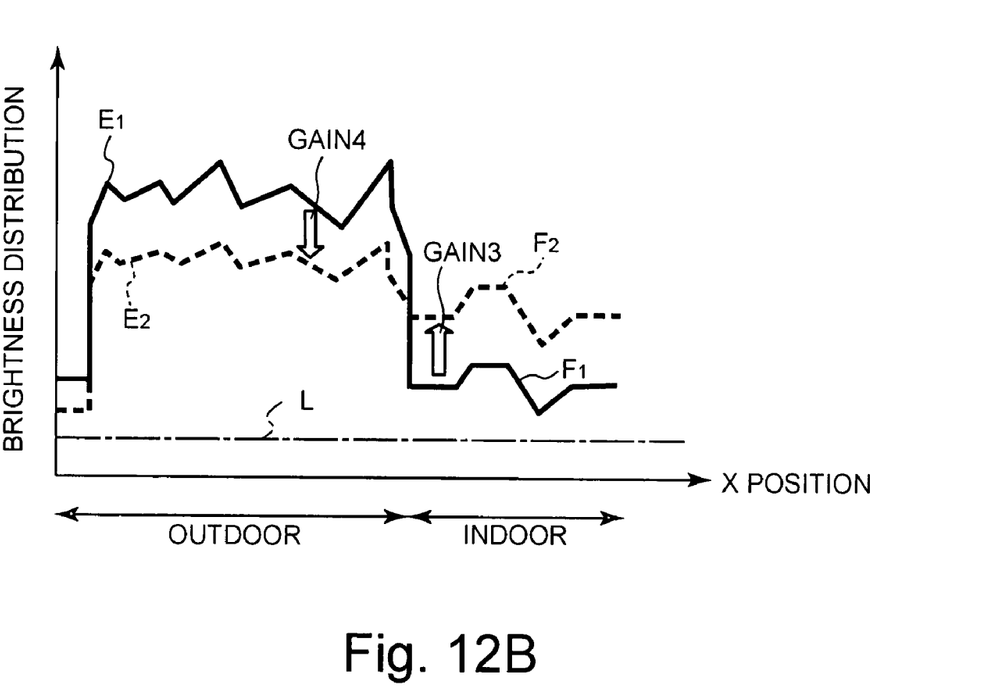

FIG. 12 is an explanatory view of a change of a luminance distribution obtained by an optimization processing section 5b. A scene as a target is a scene shown in FIG. 2A. A way to see a graph is similar to that of FIG. 4. Therefore, description of the same part is omitted. FIG. 12A shows processing in which an exposure control section 12a first increases an exposure amount to improve visibility. FIG. 12B shows processing in which the optimization processing section 5b subsequently performs amplifying correction or the like to further improve the visibility.

The embodiment will first be described with reference to FIG. 12A. In the drawing, E0 is a luminance distribution (a broken line) of an outdoor part (a landscape) before the optimization processing, and F0 is a luminance distribution (a broken line) of an indoor part (including a person). In a scene having a large luminance difference between a bright part and a dark part as in FIG. 11, the dark part (F0) is an image close to a noise level in some case. In such a case, a contrast ΔF0 of the dark place (indoor) is remarkably smaller than a contrast $\Delta E0$ of a bright place (outdoor).

To solve the problem, the exposure control section 12a first performs control so as to lengthen an exposure time or open an apparatus, thereby increasing an exposure amount, and the section accumulates signals until the outdoor part E0 reaches a level close to a saturation level. The amount of the exposure to be increased is set to such an extent that an outdoor part E1 reaches a level close to the saturation level. In consequence, the outdoor part E0 rises to E1 (a solid line), and the indoor part F0 rises to F1 (a solid line). The contrast of the outdoor part increases from $\Delta E0$ to $\Delta E1$, and the contrast of the indoor part increases from $\Delta F0$ to $\Delta F1$. The contrast $\Delta F1$ of the indoor part (the dark place) can be set to be as large as possible as compared with the noise level.

Subsequently, a brightness curve improved by exposure increase in FIG. 12A is subjected to the optimization processing to obtain further desirable brightness as shown in FIG. 12B. The optimization processing section 5b amplifies the brightness of the indoor part F1 with a gain 3 to increase from F1 to F2 (a one-dot chain line). Conversely, the outdoor part is decayed with a gain 4 (minus) to decrease from E1 to E2 (a one-dot chain line). In consequence, the dark place (the indoor part) is brightened. Moreover, possibility that the bright place (the outdoor part) is saturated can be prevented. The noise of the indoor part can be reduced. Both of the outdoor part and the indoor part are displayed with good visibility.

Figure 13:
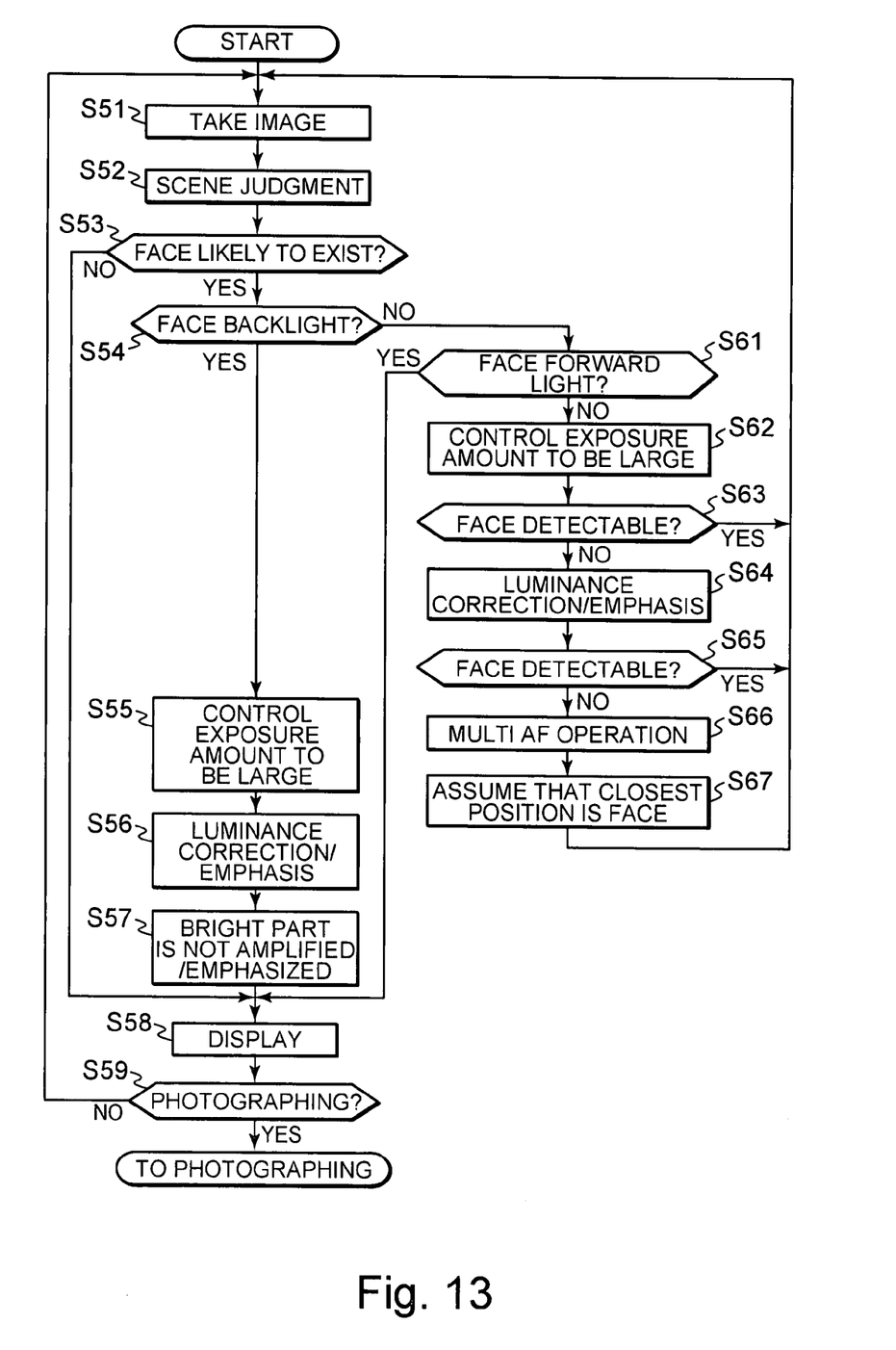
FIG. 13 is a flow chart showing a procedure of control processing in the third embodiment.

FIG. 13 is a flow chart showing a procedure of photographing control of the third embodiment described with reference to FIGS. 12A and 12B. This photographing control processing is mainly executed by an MPU 1, an image processing section 5, the optimization processing section 5b, the exposure control section 12a, a scene judgment section 12b and a face detecting section 11 according to a program.

First, an image signal is taken from an image pickup device 3 (step S51). The scene judgment section 12b judges a scene to be photographed from the taken image signal (step S52). As a result, it is judged whether or not a face is likely to exist by judging whether the center of a screen or a lower half of the screen is dark, or many dark parts exist (step S53). In a case where it is judged that the face is likely to exist (step S53 YES), it is next judged whether the face part is under backlight or forward light (steps S54, S61).

When it is judged that the face is under backlight (step S54 YES), the processing described with reference to FIGS. 12A and 12B is performed in a flow of step S55 and subsequent steps. The exposure control section 12a controls an exposure amount to be large (step S55, FIG. 12A). Moreover, the optimization processing section 5b increases luminance of a face part (dark place) signal, and increases contrast emphasis (step S56, FIG. 12B). Moreover, the luminance of a signal of the bright part is reduced, and contrast emphasis is not performed (step S57, FIG. 12B). Furthermore, an image subjected to the above-mentioned processing is displayed in a display section 8 (step S58).

Moreover, as a result of the scene judgment, it is judged that the resultant image is a scene in which the face is not like to exist (step S53 NO) or that the face is under the forward light (step S61 YES), the image is not subjected to any optimization processing, and is displayed (step S58).

On the other hand, when the face is likely to exist (step S53 YES) and any face is not judged (step S61 NO), a flow of step S62 and subsequent steps is executed. To bring the image of the dark part to the surface, the exposure control section 12a controls the exposure amount to be larger (step S62). Moreover, the face detecting section 11 judges whether or not the face exists (step S63). In consequence, if a position of the face can be detected (step S63 YES), this result is reflected, and the flow from the step S51 is resumed. When the face detecting section 11 cannot detect any face, the optimization processing section 5b further processes the image of the dark part for luminance correction/contrast emphasis (step S64). Moreover, the face detecting section 11 judges whether or not the face exists (step S65). In consequence, if the position of the face can be detected (step S65 YES), this result is reflected, and the flow from the step S51 is resumed.

However, when the image contains a side face, a back part or the like, the face detecting section 11 cannot detect the position of the face in some time. In this case, a result of an AF operation is used. While a focal position of a photographing lens is changed (a so-called multi AF operation), a change of the contrast at each position of the screen is detected (step S66). It is supposed that the closest subject exists at a position of the screen where the contrast increases when a lens is positioned at a foremost point. It is presumed that the face exists at this position (step S67). Moreover, the flow returns to the step S51 and restarts. The subject face countenance and complexion can cleanly be seen.

As described above, after the display (step S58), a photographing instruction is waited (step S59). When a photographing operation is performed (step S59 YES), a photographing sequence is performed. Needless to say, the exposure or luminance correction may be performed during the photographing. When the image is picked up in-accordance with the face position and brightness obtained in this manner during not only the monitor display but also the photographing, a clean photograph can be taken.

As described above, even in the scene having a large luminance difference, the dark place can be brightened without increasing any noise, and even the bright place can be displayed without any possibility of saturation. Both of the outdoor part and the indoor part can be displayed with good visibility.

Other Examples

It is to be noted that in the above embodiments, the processing by the MPU 1, the exposure control section 12a and the scene judgment section 12b determined in the above embodiments may partially or entirely be constituted of hardware. Conversely, hardware such as the optimization processing section 5b and the face detecting section 11 may be constituted of software. Specific constitution is a matter of design.

Furthermore, each control processing by the MPU 1 is realized by supplying a software program stored in an ROM 19 to the MPU to operate the MPU as described above according to the supplied program. Therefore, the program itself of the software realizes a function of the MPU 1, and the program itself constitutes the present invention.

In addition, a recording medium to store the program constitutes the present invention. As the recording medium, in addition to a flash memory, an optical recording medium such as a CD-ROM or a DVD, a magnetic recording medium such as an MD, a tape medium, a semiconductor memory such as an IC card or the like may be used. In each embodiment, an example in which the present invention is applied to a digital camera has been described, but the present invention is not limited to this example, and the present invention may be applied to, for example, a camera section of a cellular phone.

While there has been shown and described what are considered to be preferred embodiments of the invention, it will, of course, be understood that various modifications and changes in form or detail could readily be made without departing from the sprit of the invention. It is therefore intended that the invention should not be limited to the exact forms described and illustrated, but constructed to cover all modifications that may fall within the scope of the appended claims.

What is claimed is:

1. A camera comprising:
 a visibility improvement section which corrects an image signal of a subject acquired from an image pickup device so that luminance of the image signal is raised in accordance with luminance of each of divided regions of the subject in order to improve visibility of the subject;
 a display section which displays an image based on the image signal of the subject acquired from the image pickup device;
 a scene judgment section which judges a whether scene is a backlight scene or not;
 a control section which controls the visibility improvement section; and
 a face detecting section which detects a face of the subject,
  wherein the visibility improvement section sets a correction amount of the luminance of an actually photographed image to be smaller than that of an image for monitoring to be displayed in the display section,
  wherein the control section effects the visibility improvement section, when the scene judgment section judges that the subject is the backlight scene, and
  wherein when the face detecting section detects the face, the control section prohibits the effect of the visibility improvement section, even in a case where the subject is the backlight scene.

2. The camera according to claim 1, further comprising:
 an illuminating section which irradiates the subject during photographing; and
 an exposure control section which controls the illuminating section to control exposure of the subject,
  wherein, during the photographing, the exposure control section controls the illuminating section so that the luminance of the actually photographed image is substantially equal to that of the image for monitoring having the luminance corrected by the visibility improvement section.

3. The camera according to claim 1, further comprising:
 an illuminating section which irradiates the subject during photographing; and
 an exposure control section which controls the illuminating section to control exposure of the subject,
 wherein the exposure control section controls the illuminating section so as to change a quantity of irradiation light to be emitted during the photographing in accordance with the correction amount of the image for monitoring set by the visibility improvement section.

4. The camera according to claim 3, wherein the exposure control section controls the illuminating section so as to increase the quantity of the irradiation light to compensate for a shortage of the luminance, when the correction amount of the image for monitoring set by the visibility improvement section is large.

5. The camera according to claim 1, further comprising:
 a display control section in which the image for monitoring corrected by the visibility improvement section and the image for monitoring that is not corrected are simultaneously displayed.

6. A camera comprising:
 a visibility improvement section which corrects an image signal of a subject acquired from an image pickup device so that luminance of the image signal is raised in accordance with luminance of each of divided regions of the subject in order to improve visibility of the subject;
 a display section which displays an image based on the image signal of the subject acquired from the image pickup device;
 a scene judgment section which judges whether a scene is a backlight scene or not;
 a control section which controls the visibility improvement section;
 an illuminating section which irradiates the subject during photographing; and
 an exposure control section which controls the illuminating section to control exposure to the subject,
  wherein the visibility improvement section sets a correction amount of the luminance of an actually photographed image to be smaller than that of an image for monitoring to be displayed in the display section,
  wherein the control section effects the visibility improvement section, when the scene judgment section judges that the subject is the backlight scene, and
  wherein during the photographing in which it is judged that the subject is the backlight scene, the exposure control section performs control so that the lesser amount of correction set by the visibility improvement section compared with the correction amount of the image for monitoring is compensated with illumination of the illuminating section.

7. The camera according to claim 6,
 wherein the visibility improvement section increases the correction amount of the image signal so that the face detecting section is able to detect the face.

8. The camera according to claim 6,
 wherein the visibility improvement section corrects a dark region including the face so as to increase luminance of the region.

9. The camera according to claim 6, wherein the visibility improvement section corrects a contrast value of the image for each region as well as the luminance of the each region, and sets the correction amount of the contrast value of the actually photographed image to be smaller than that of the image for monitoring to be displayed in the display section.

10. The camera according to claim 6, further comprising:
 a display control section in which the image for monitoring corrected by the visibility improvement section and the image for monitoring that is not corrected are simultaneously displayed.

* * * * *